US006708174B1

(12) United States Patent
Tenorio

(10) Patent No.: US 6,708,174 B1
(45) Date of Patent: Mar. 16, 2004

(54) SYSTEM AND METHOD FOR RETRIEVING INFORMATION ACCORDING TO IMPROVED MATCHING CRITERIA

(75) Inventor: Noel Tenorio, Mountain View, CA (US)

(73) Assignee: i2 Technologies, Inc., Dallas, TX (US)

(*) Notice: Subject to any disclaimer, the term of this patent is extended or adjusted under 35 U.S.C. 154(b) by 131 days.

(21) Appl. No.: 09/742,851

(22) Filed: Dec. 20, 2000

(51) Int. Cl.[7] .............................................. G06F 17/30
(52) U.S. Cl. ......................................................... 707/10
(58) Field of Search ........................... 707/5, 102, 104, 707/10, 1, 3, 100, 7; 34/810

(56) References Cited

U.S. PATENT DOCUMENTS

| 4,996,642 | A | | 2/1991 | Hey .............................. 705/27 |
| 5,041,972 | A | | 8/1991 | Frost ............................ 705/10 |
| 5,237,496 | A | | 8/1993 | Kagami et al. ............... 705/10 |
| 5,321,833 | A | * | 6/1994 | Chang et al. .................. 707/5 |
| 5,712,989 | A | | 1/1998 | Johnson et al. .............. 705/28 |
| 5,715,444 | A | | 2/1998 | Danish et al. ................. 707/4 |
| 5,734,890 | A | | 3/1998 | Case et al. ..................... 707/5 |
| 5,765,143 | A | | 6/1998 | Sheldon et al. .............. 705/28 |
| 5,819,245 | A | | 10/1998 | Peterson et al. ............. 706/16 |
| 5,835,087 | A | * | 11/1998 | Herz et al. .................. 345/810 |
| 5,903,892 | A | * | 5/1999 | Hoffert et al. ............... 707/10 |
| 5,909,023 | A | | 6/1999 | Ono et al. ................... 235/380 |
| 5,918,223 | A | * | 6/1999 | Blum et al. .................... 707/1 |
| 5,960,414 | A | | 9/1999 | Rand et al. .................. 705/28 |
| 5,963,920 | A | | 10/1999 | Rose et al. ................... 705/28 |
| 5,963,948 | A | * | 10/1999 | Shilcrat ...................... 707/100 |
| 5,983,220 | A | * | 11/1999 | Schmitt ......................... 707/5 |
| 6,009,407 | A | | 12/1999 | Garg ........................... 705/10 |
| 6,012,051 | A | | 1/2000 | Sammon, Jr. et al. ....... 706/52 |
| 6,018,738 | A | | 1/2000 | Breese et al. ............... 707/100 |
| 6,049,777 | A | | 4/2000 | Sheena et al. ............... 705/10 |
| 6,055,519 | A | | 4/2000 | Kennedy et al. ............. 705/80 |
| 6,064,980 | A | | 5/2000 | Jacobi et al. ................ 705/26 |

(List continued on next page.)

FOREIGN PATENT DOCUMENTS

| EP | 0463616 A2 | 6/1991 | ........... G06F/15/21 |
| WO | WO 96/12238 | 4/1996 | ........... G06F/17/30 |
| WO | WO 97/02537 | 1/1997 | ........... G06F/17/60 |

OTHER PUBLICATIONS

Funaki, et al. "Method and System for Production Planning Transaction," Identifier: JP 2001331693 A, Nov. 30, 2001.
Unknown, "Sellers Flock to OutletZoo.com as New Automatic Price Drop Method Moves Excess Inventory Online," Business Wire, Collaborative Communications, Inc., 2 pages, Oct. 25, 1999.
Unknown, "OpenSite Technologies, Inc. Helps AOL Raise $100,000 With Online Charity Auction," Business Wire, 1 page, Jan. 6, 1999.

(List continued on next page.)

Primary Examiner—Diane D. Mizrahi
Assistant Examiner—Neveen Abel-Jalil
(74) Attorney, Agent, or Firm—Baker Botts, L.L.P.

(57) ABSTRACT

A system for retrieving information for a user includes a database containing values for one or more parameters of one or more available items, each available item with corresponding parameter values. A matching server receives values for one or more parameters of a target item, these parameters being organized into subsets. The matching server applies the parameter values for the target item against the database and, for each available item and each parameter subset of the target item, computes a distance between the parameter values for the available item and the parameter values for the target item. For each of the parameter subsets, the matching server then applies a weight to the distance to compute a weighted distance for the parameter subset. The matching server computes an overall distance between the available item and the target item based on the weighted distances for the parameter subsets and returns results to the user reflecting the overall distance for the available item. The user may be a buyer and the overall distance for the available item may allow the buyer to make a purchasing decision with respect to the available item.

54 Claims, 4 Drawing Sheets

U.S. PATENT DOCUMENTS

| | | | | |
|---|---|---|---|---|
| 6,167,380 | A | 12/2000 | Kennedy et al. | 705/10 |
| 6,195,652 | B1 | 2/2001 | Fish | 707/2 |
| 6,249,774 | B1 | 6/2001 | Roden et al. | 705/28 |
| 6,266,642 | B1 | 7/2001 | Godin et al. | 705/37 |
| 6,266,649 | B1 | 7/2001 | Linden et al. | 705/26 |
| 6,286,005 | B1 * | 9/2001 | Cannon | 707/100 |
| 6,321,133 | B1 | 11/2001 | Smirnov et al. | 700/100 |
| 6,324,522 | B2 | 11/2001 | Peterson et al. | 705/28 |
| 6,360,227 | B1 * | 3/2002 | Aggarwal et al. | 707/102 |
| 6,523,026 | B1 * | 2/2003 | Gillis | 707/3 |
| 2002/0013721 | A1 | 1/2002 | Dabbiere et al. | 705/7 |
| 2002/0019761 | A1 | 2/2002 | Lidow | 705/10 |

OTHER PUBLICATIONS

Unknown, "News Briefs," Interactive PR & Marketing News, 2 pages, Sep. 19, 1997.

PCT, Notification of Transmittal of the International Search Report or the Declaration, 3 pages, Jan. 17, 2002.

PCT, Notification of Transmittal of the International Search Report or the Declaration, 6 pages, Jan. 23, 2002.

PCT, Notification of Transmittal of the International Search Report or the Declaration, 7 pages, Feb. 6, 2002.

PCT, Notification of Transmittal of the International Search Report or the Declaration, 7 pages, Feb. 13, 2002.

PCT, Notification of Transmittal of the International Search Report or the Declaration, 5 pages, Feb. 13, 2002.

PCT, International Search Report 5 pages, May 14, 2002.

PCT, Notification of Transmittal of the International Search Report or the Declaration, 3 pages, Aug. 29, 2002.

N. Tenorio, "System and Method for Negotiating According to Improved Matching Criteria," application Ser. No. 09/750,617, pending, Dec. 20, 2000.

Notani, et al., "Extreme Capacity Management in an Electronic Marketplace Environment," application Ser. No. 09/841,320, pending, Apr. 23, 2001.

S. Iyer, et al., "Product Substitution Search Method," Appln. Serial No. 09/594,652, pending, Jun. 15, 2000.

* cited by examiner

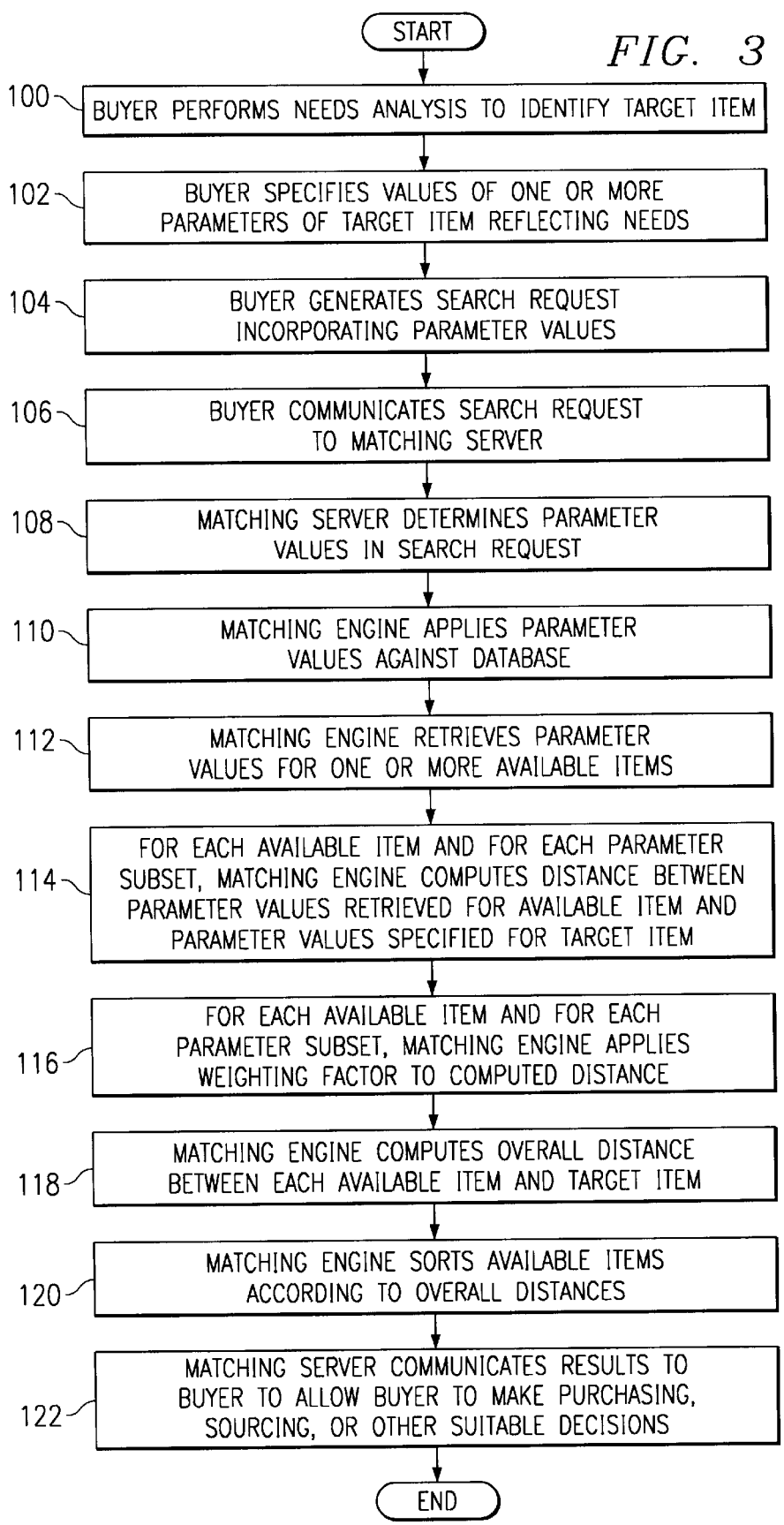

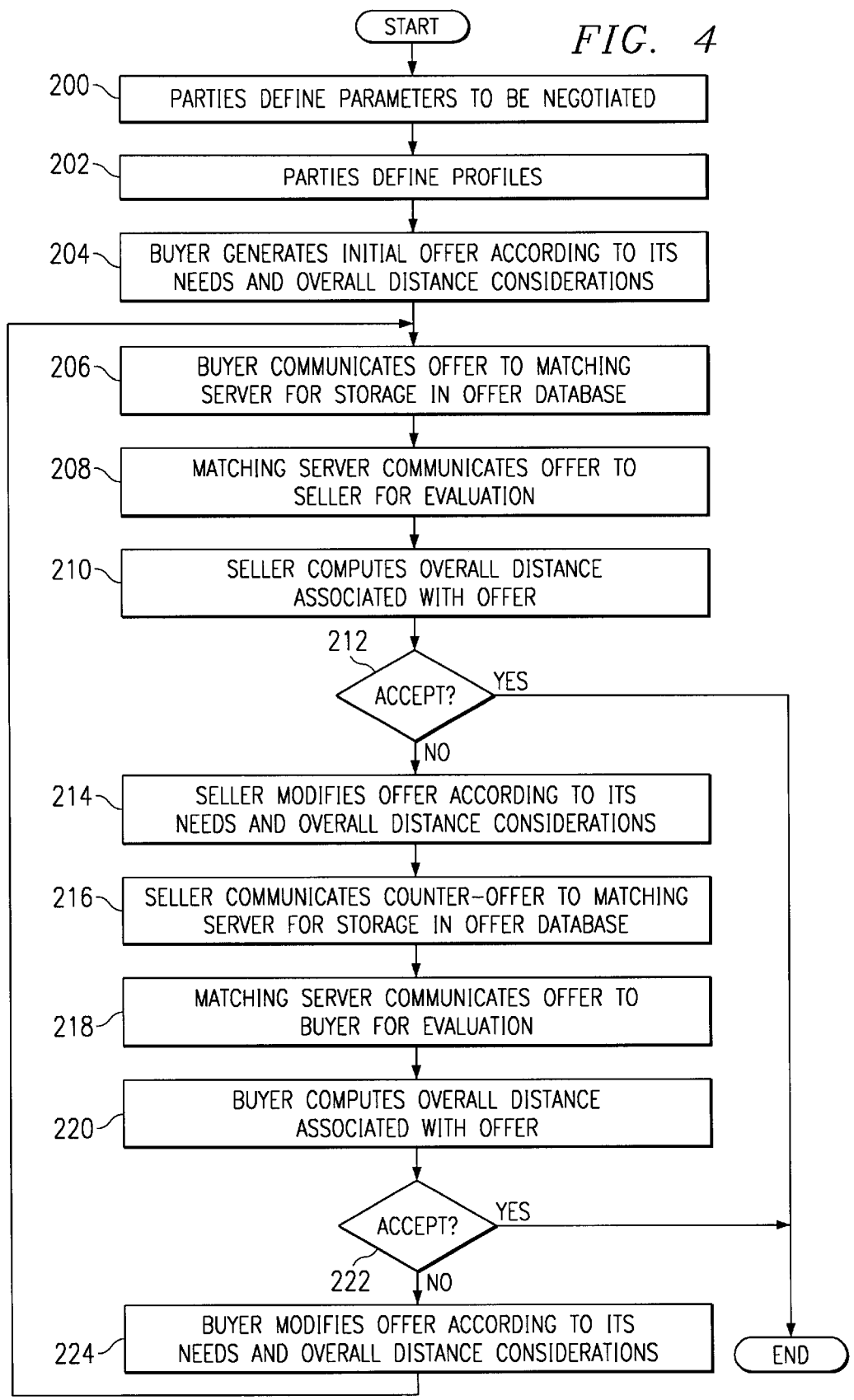

SYSTEM AND METHOD FOR RETRIEVING INFORMATION ACCORDING TO IMPROVED MATCHING CRITERIA

CROSS-REFERENCE TO RELATED APPLICATION

This application is related to pending U.S. application Ser. No. 09/750,617 entitled "System and Method for Negotiating According to Improved Matching Criteria," which was also filed on Dec. 20, 2000 by Noel Tenorio.

TECHNICAL FIELD OF THE INVENTION

This invention relates generally to electronic retrieval of information, and more particularly to a system and method for retrieving information according to improved matching criteria.

BACKGROUND OF THE INVENTION

Users with information needs often construct search requests that reflect these needs for submission to a search engine. For example, a user might construct and submit a query in Structured Query Language (SQL) format to obtain availability, pricing, and other information concerning a part used in manufacturing a product. These queries typically limit a user to Boolean operators in expressing needs, which may prevent the user from fully and precisely expressing the needs and thus prevent the search engine from retrieving results that optimally satisfy the needs. As an example, the user might query a parts catalog for all available capacitors with capacitances between $C_1$ and $C_2$, voltage characteristics between $V_1$ and $V_2$, and temperature characteristics between $T_1$ and $T_2$. In response to the query, the search engine returns search results to the user identifying all the capacitors in the parts catalog that satisfy the query.

Although the search engine may very easily return all the capacitors within the "hypercube" defined by these capacitance, voltage, and temperature parameters, the user may still be forced to manually evaluate the information to sort the capacitors according to their overall suitability in order to select a particular capacitor. Where the catalog of parts is relatively large, such a query may yield a huge number of results, making the manual evaluation and sorting of these results a daunting task. It is often very difficult for the user to assess various tradeoffs associated with the results, none of which may match all of the needs exactly. Where the number of parameters ("dimensionality") of the query is also large, this task may become even more difficult. Moreover, if queries for a large number of items are processed on a continuing basis, such as in connection with parts procurement for a large manufacturing organization, this task may become truly mind-boggling. Analogous deficiencies may arise in the context of negotiations between parties with respect to items.

SUMMARY OF THE INVENTION

According to the present invention, problems and disadvantages associated with previous techniques for the retrieval of information have been substantially reduced or eliminated.

According to one embodiment of the present invention, a system for retrieving information for a user includes a database containing values for one or more parameters of one or more available items, each available item having corresponding parameter values. A matching server receives values for one or more parameters of at least one target item, the parameters for the target item being organized into one or more subsets. The matching server applies the parameter values for the target item against the database and, for at least one available item and for each of the parameter subsets of the target item, computes a distance between the parameter values for the available item and the parameter values for the target item. For each of the parameter subsets, the matching server applies a weight to the distance to compute a weighted distance for the parameter subset. The matching server then computes an overall distance between the available item and the target item, according to the weighted distances for the parameter subsets, and returns results to the user reflecting the overall distance for the available item. In a more particular embodiment, the user is a buyer who uses the overall distance for the available item to make a purchasing decision with respect to the available item.

The present invention provides a number of technical advantages over previous techniques. The present invention allows a buyer or other user seeking information to more precisely express its information needs and preferences, including any acceptable compromises, such that the information returned to the user better matches those needs and preferences. For example, the present invention allows buyers to more precisely describe items they would like to purchase using improved matching criteria and more quickly identifies acceptable items available from sellers, providing improved multi-dimensional, electronic commerce. The present invention similarly provides improved multi-dimensional offer creation and evaluation in the context of a mediated or other negotiation between a buyer and a seller. Systems and methods incorporating one or more of these or other advantages are well suited for modern commercial environments such as those associated with Internet-accessible websites or electronic marketplaces. Other technical advantages will be readily apparent to those skilled in the art from the following figures, descriptions, and claims.

BRIEF DESCRIPTION OF THE DRAWINGS

To provide a more complete understanding of the present invention and features and advantages thereof, reference is made to the following description in conjunction with the accompanying drawings, in which:

FIG. 3 illustrates an exemplary method of retrieving information according to improved matching criteria; and FIG. 4 illustrates an exemplary method of negotiating over one or more parameters according to improved matching criteria.

DETAILED DESCRIPTION OF THE INVENTION

Figure 1:
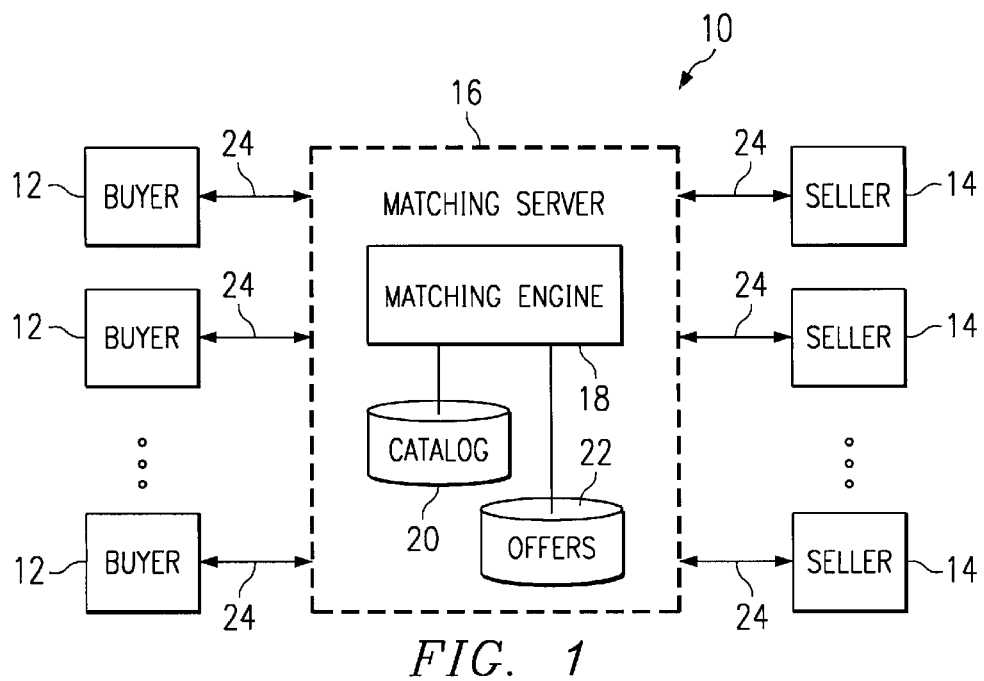
FIG. 1 illustrates an exemplary system for retrieving information according to improved matching criteria.

FIG. 1 illustrates an exemplary system 10 for retrieving information using improved matching criteria. System 10 includes one or more buyers 12, one or more sellers 14, and at least one matching server 16 associated with a website, electronic marketplace, or other environment accessible to buyer 12 and sellers 14. In general, matching server 16 receives a search request from buyer 12 expressing the needs of the buyer 12, for example, needs for one or more target products, services, properties, documents, or other items that may be obtained from sellers 14 through a marketplace associated with matching server 16. The needs of the buyer 12 are expressed fully and precisely in terms of improved matching criteria relating to each of the target items, as described below. In response to the search request, matching server 16 uses associated matching engine 18 to apply these matching criteria against a catalog database 20 that contains information concerning items currently or potentially available from sellers 14 or against an offer database 22 containing pending offers from one or more sellers 14. Matching engine 18 retrieves information concerning available items from appropriate database 20 or 22, according to the matching criteria, and returns results to buyer 12. The results are preferably sorted based on the overall distances between the available items and the target item reflecting their relevance to buyer 12, preferences of buyer 12, or other suitable considerations, to allow buyer 12 to make purchasing or other suitable decisions.

Buyers 12 may be any suitable entities that access matching server 16, either autonomously or relying upon input from associated persons, to discover information concerning one or more available items in connection with a purchase or otherwise. Sellers 14 may be any suitable entities that provide information to matching server 16 concerning the available items. Buyers 12, sellers 14, and matching server 16 may be coupled to one another using links 24 each including one or more local area networks (LANs), metropolitan area networks (MANs), wide area networks (WANs), at least a portion of a global computer network such as the Internet, or other suitable wireline, wireless, or other links. The components of matching server 16 may operate on one or more computer systems at one or more locations. Although the matching server 16 is described primarily as separate from buyers 12 and sellers 14, matching server 16 may share one or more computer resources or other appropriate resources with one or more buyers 12 or sellers 14 according to particular needs.

A search request may be generated for any suitable purpose. For example, the buyer 12 may be a consumer who generates and submits a search request to a shopping "bot" associated with the matching server 16 to determine availability, pricing, or other information concerning a retail product that the consumer is interested in purchasing. Alternatively, the buyer 12 may be a procurement manager or autonomous procurement process within an enterprise that generates and submits search requests, in the form of requests for quotes (RFQs), concerning parts needed to manufacture products. As yet another alternative, buyer 12 may generate and submit search requests, in the form of offers and counteroffers, during a negotiation with one or more sellers 14 mediated by matching server 16 in the manner described more fully below. The present invention contemplates a buyer 12 expressing its needs for information concerning one or more available items in any format and for any purpose, all such formats and purposes being collectively encompassed herein using the phrase "search request."

In one embodiment, for each target item identified in a search request, the search request specifies values for one or more features, characteristics, or other parameters of the target item, organized into one or more subsets, according to the needs of buyer 12. The matching engine 18 of matching server 16 applies these parameter values against database 20 or 22, as appropriate, to compute a distance between an available item and the target item for each parameter subset.

In a particular embodiment, the distance between an available item and the target item for a parameter subset may be computed using the following equation:

$$L_n = \sqrt[n]{\frac{\sum_{k}^{K} |available_k - target_k|^n}{K}} \qquad (1)$$

where K is number of parameters in the subset, $available_k$ is the value for the available item obtained from database 20 or 22 for the kth parameter, $target_k$ is the value specified for the target item for the kth parameter, the summation is over all K parameters in the subset, and n is the order of the distance measure. The order n may be specified in any suitable manner. In one embodiment, buyer 12 specifies the order n for each parameter subset explicitly according to its needs. Alternatively, the values of n for one or more parameter subsets may be specified automatically (at matching server 16 for example) based on information contained in the search request, may be a default value, or may be determined in any other suitable manner. The present invention contemplates use of any other suitable distance measure to replace or combine with the distance measure set forth in equation (1).

Figure 2A:
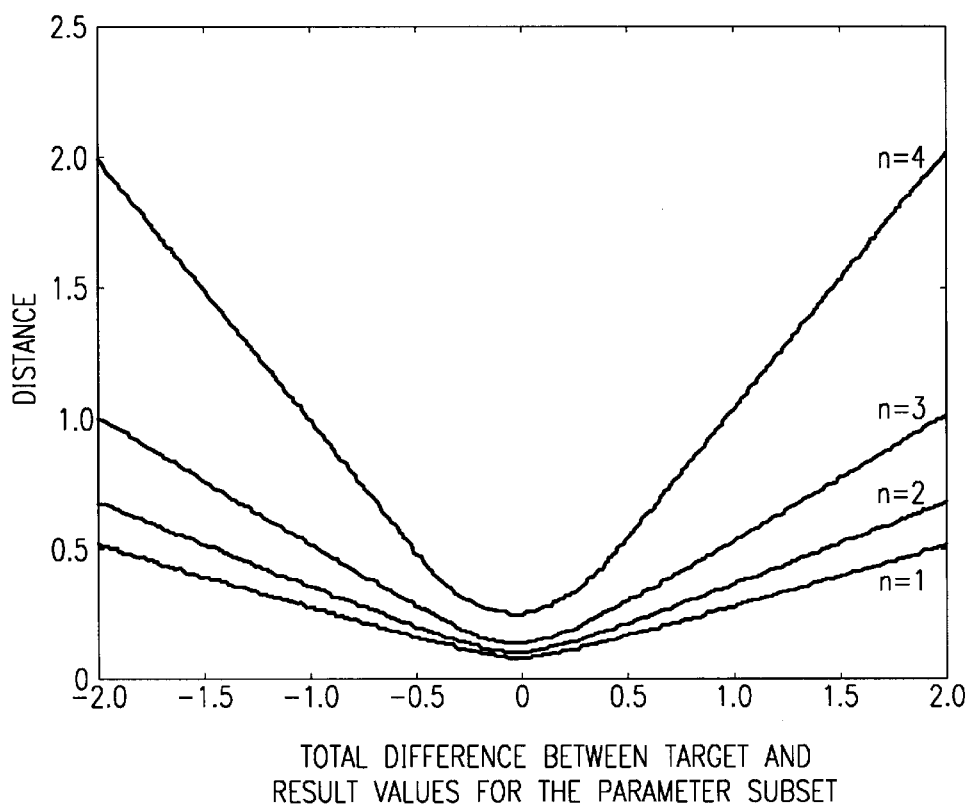
FIGS. 2A through 2C illustrate exemplary distances between the parameter values for an available item and the parameter values for a target item.
Figure 2B:
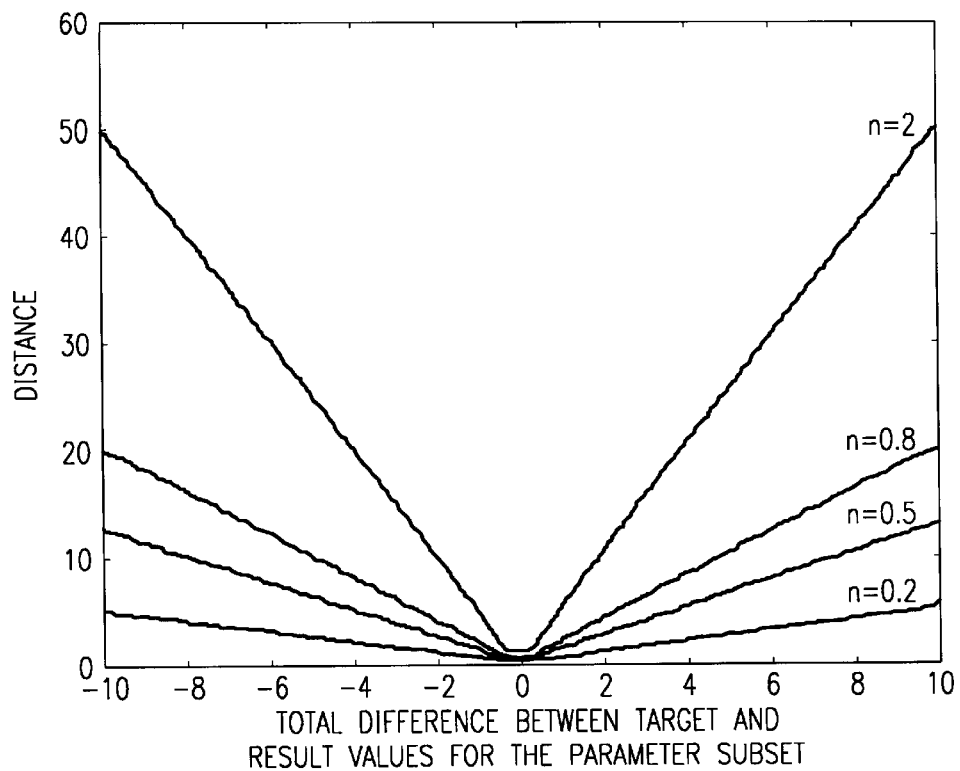
Figure 2C:
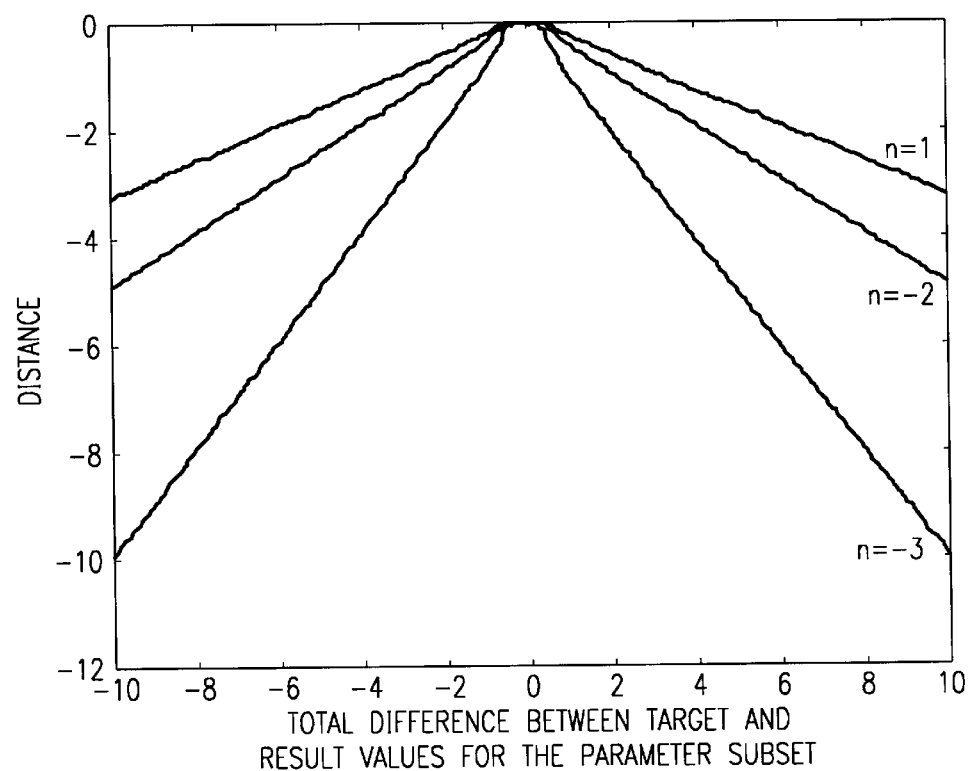

FIGS. 2A through 2C illustrate exemplary behavior of the distance measure described above, plotted on the vertical axis, for an exemplary subset of parameters. The total difference between the parameter values for the available item and the target item for the parameter subset (the sum of $|available_k - target_k|$ over all K parameters in the subset) is plotted on the horizontal axis. Plots are provided for exemplary values of n. As seen in FIGS. 2A and 2B, for positive n, the penalties for outlying results (with relatively large total differences) increase as n increases. Thus, in general, specifying a larger value of n causes outlying results to be ranked lower in a sorted list of search results than these results would have been ranked using a smaller value of n.

For example, buyer 12 might specify n=1 for a first subset of parameters of a target item to ensure that values for the available item for these parameters either exactly match the specified values for the target item or, if an exact match is unavailable for a parameter, that the difference between the values for the available item and the target item for the parameter is minimized. Buyer 12 might specify n=2 for a second subset of parameters of the target item, still within the same search request. By specifying n=2, buyer 12 may seek to ensure that all values for the available item for these parameters closely match the corresponding values for the target item simultaneously, even though exact matches are not required for any of these parameters. The buyer 12 might also specify n=3 for a third subset of parameters of the target item, still in the same search request. By specifying n=3, the buyer 12 might seek to ensure that all values for the available item for these parameters even more closely match values for the target item simultaneously, again where exact matches are not required.

In contrast, as seen in FIG. 2C for negative n, penalties for outlying results will decrease as n becomes increasingly negative. Therefore, specifying a more negative value of n causes the outlying results to be ranked higher within a sorted list of search results than these results would have been ranked using a less negative value of n. For example, buyer 12 might specify n=−1 for a fourth subset of parameters of a target item, still within the same search request, to seek to ensure that values for the available item for these parameters will not exactly match the specified values for the target item and that the difference between such values is maximized. Buyer 12 might specify n=−2 for a fifth subset of parameters of the target item, still contained in the same search request. By specifying n=−2, buyer 12 might seek to ensure that all values for the available item for these parameters even less closely match corresponding values for the target item simultaneously, where exact matches are still prohibited for any of these parameters. According to the present invention, any appropriate value of n may be used for each of one or more subsets of parameters, and each parameter subset may have the same or a different value of n as any other subset, according to particular needs.

As a more particular example, consider a situation in which buyer 12 wishes to purchase a quantity of capacitors from one or more sellers 14 to meet a manufacturing need. In a simplified exemplary case, the buyer 12 might specify target values for the capacitance, a voltage characteristic, a temperature characteristic, and the price. If the buyer specifies n=1, the search results may be ranked such that a capacitor with exactly matching capacitance, voltage characteristic, and temperature characteristic, but with a much larger then desired price, is returned at or near the top of a sorted list. This may reflect the reality that, although one or more capacitors exactly matching the functional requirements of buyer 12 are available, none is available at the buyer-specified price. Buyer 12 may then elect to purchase a quantity of these capacitors from the associated seller 14, since they are exactly what buyer 12 wanted, and compromise with respect to price. If buyer 12 had specified n=2, however, these search results may be ranked such that a capacitor with closely matching capacitance, voltage characteristic, temperature characteristic, and price is returned at or near the top of a sorted list. Buyer 12 might elect to purchase a quantity of these capacitors from associated seller 14, even though they are not exactly what buyer 12 wanted with respect to any particular feature, since this compromise is most acceptable overall. Although capacitors are discussed in this example, analogous needs may be specified and compromises accepted in connection with any other parts, components, or products. Moreover, as discussed above, analogous searches for services, property, documents, or other items may be performed.

In one embodiment, matching engine 18 combines the distances computed for the individual subsets of parameters of the target item to generate an overall distance for the corresponding available item. Matching engine 18 may then rank one or more available items according to their overall distances to generate a sorted list from which buyer 12 may choose or otherwise rely upon. In a particular embodiment, a weight is applied to the distance for each parameter subset according to the following equation:

$$D = \sum_{j}^{J} w_j L_{n_j} \quad (2)$$

where D is the overall distance for the available item, $l_j$ is the distance for the jth parameter subset, $w_j$ is the weight for the jth parameter subset, and the summation is over all J parameter subsets. The weights w may be specified in any appropriate manner. In one embodiment, the buyer 12 specifies values of w according to the needs expressed in the search request and the manner in which buyer 12 desires the search results to be sorted. In the alternative, the values of w may be specified automatically (at matching server 16 for example) based on information contained in the search request, may be a default value, or may be determined in another suitable manner. The present invention contemplates any suitable value of w for each of one or more subsets of parameters, and each subset having the same or a different value of w as any other subset, according to particular needs. In a simple case in which a single parameter subset exists containing some or all of the total set of parameters available to be specified, w=1 by default. The present invention contemplates use of any other suitable expression for overall distance or any other appropriate weighting scheme to replace or combine with that set forth in equation (2).

In a particular embodiment, the overall distance is computed using the following simplified formula suitable for a variety of needs:

$$D = w_1 L_{n_1} + w_2 L_{n_2} \quad (3)$$

where J=2, n=1 for a first parameter subset yielding a distance measure based on the absolute error (ABS), and n=2 for a second parameter subset yielding a distance measure based on the mean-square error (MSE). In general, as described above, an absolute error distance measure forces the values for the available item for the associated parameter subset to exactly match the values for the target item where possible and, where not possible for a parameter, forces a compromise to be made to minimize the difference between the values for the parameter and thus minimize the distance for the parameter subset. In contrast, using a mean-square error distance measure, all the values for the available item for the associated parameter subset are forced to closely match the values for the target item simultaneously and thus to minimize the distance for the parameter subset. Weights w are applied to each distance and the results summed to generate the overall distance for the available item according to which the available item is ranked relative to the other available items.

In one embodiment, buyer 12 may use a web-based or other form that the buyer 12 completes by specifying one or more target items, one or more parameter subsets for each target item, the values of the parameters in each subset, an order n for each subset, and a weight w for each subset. Buyer 12 will preferably be able to select a target item from among a number of possible target items by entering the name, number, or other identifier for the target item using a pull-down menu or in any other suitable manner. Similarly, buyer 12 may be able to select from among a number of possible parameters of the target item to generate parameter subsets for the target item and select from among a number of possible values for each parameter. Buyer 12 might specify n explicitly for each subset or, alternatively, select from among a number of categories identified in a user-friendly manner using a pull-down menu or otherwise. Where n is not specified explicitly, the matching server 16 may infer the appropriate value for use by matching engine 18 in generating a distance for the parameter subset.

For example only, and not by way of limitation, categories may include "Exact Match" (which might correspond to n=1), "Close Match" (which might correspond to n=2), "Cannot Be" (which might correspond to n=−1), or any other suitable categories according to particular needs. Buyer 12 may use suitable Boolean operators to specify limits or to otherwise replace or combine with the implicit or explicit specification of n for a parameter subset. As just an example, the buyer 12 might select a "Close Match" category for a subset, while also specifying a "Greater Than" Boolean operator for the subset, to specify that associated values for available items all be close to but not less than values for the target item simultaneously. By explicitly or implicitly specifying an order n for each of perhaps multiple parameter subsets for a target item, with or without any cooperating Boolean or other operators, buyer 12 is able to specify rich matching criteria not available using prior techniques.

Buyer 12 may similarly be able to specify w explicitly for each parameter subset or select from among a number of possibilities identified in a user-friendly manner using a pull-down menu or otherwise. Where w is not specified explicitly, matching server 16 may infer the appropriate value for use by matching engine 18 in generating the list of available items sorted according to their overall distances. As an example and without limitation, possibilities might include "Very Important" (corresponding to a very small w), "Important" (corresponding to a larger w), "Slightly Important" (corresponding to an even larger w), "Desirable Only" (corresponding to a still larger w), or any other suitable possibility according to particular needs. By explicitly or implicitly specifying a weight w for each of perhaps multiple parameter subsets for a target item, buyer 12 is able to specify rich matching criteria not available using prior techniques.

In one embodiment, buyer 12 may submit a search request reflecting an ideal or otherwise desirable sample result. In response, matching server 18 may manipulate the search request to place it into a format suitable for application against database 20 or 22, by determining values for n and w for one or more parameter subsets for example, if the search request is not already suitable.

As just an example of the rich possibilities provided according to the present invention, a buyer 12 interested in searching for a car may express its need for a FORD or CHEVROLET truck, preferably FORD but CHEVROLET will be acceptable provided the price of the CHEVROLET is at least ten percent lower than the price of the FORD, where the color must be blue unless it is a FORD and the price is below $20,000 in which case black will also be acceptable, and where the truck is less than approximately two years old and has less than approximately 25,000 miles but no more than 30,000 miles if the price is greater than approximately $25,000. As another example, a buyer 12 interested in searching for a piece of real estate may express a need for a single family home in the Dallas metroplex, preferably less than ten miles from downtown if the public schools are at least very good but within approximately twenty miles of downtown will be acceptable provided that public schools are excellent, where the home is between twenty and thirty years old and between approximately 2000 and 2400 square feet, where there are exactly two bathrooms if the square footage is below 2100 and exactly three bathroom if the square footage is below 2450, and where there will be absolutely no heavy industry within five miles if the price is at least $200,000. These are merely examples of needs that a buyer 12 might express in a search request according to the present invention. These needs, which can be fully and precisely expressed using rich matching criteria and then readily applied against a database 20 or 22 at the matching server 16 to generate a list of available items sorted based on relevance, preference, or other considerations. Such features are difficult or impossible to handle using previous techniques.

The sorting of search results, once they have been generated, may be especially important in conducting e-commerce or otherwise searching for information using the Internet. For example, with an existing search engine such as YAHOO! a single query may yield a list of thousands of web pages, most of which have little or nothing to do with the true information needs of the user. Even if this list is sorted according to, for example, the frequency and proximity of the search terms within these web pages, the web pages of most interest to the user will seldom be at or near the top of the list. As a result, a user is generally required to manually browse through numerous web pages in the list until the user finds a web page meeting its needs or gives up in frustration with some or all of the needs left unmet. This situation, which is merely unpleasant for the casual user, may be totally unacceptable for a person in an enterprise who must submit and evaluate results for a large quantity of queries, such as a procurement manager in a manufacturing enterprise. Moreover, search engines such as YAHOO! cannot begin to handle rich matching criteria such as those described above. The deficiencies may be particularly severe for high-dimensionality queries, for example, where a target part has fifty parameters that must be evaluated simultaneously to arrive at a list of acceptable available parts from which a buyer 12 may choose. The present invention overcomes these and other deficiencies.

As noted above, matching engine 18 may apply the search request received from buyer 12 against offer database 22 in certain circumstances. In one embodiment, these circumstances include a negotiation between a buyer 12 and one or more sellers 14. Buyer 12 may first identify its needs, which as described above may be reflected using values for one or more parameters within each of one or more parameter subsets. For example, buyer 12 may identify its needs for a FORD truck with less than approximately 45,000 miles, preferably blue but any color except black would be acceptable and the lighter the color the better, between $20,000 and $25,000 with two-wheel drive but up to approximately $30,000 if four-wheel drive, and a five year power train warranty.

In one embodiment, within a pre-negotiation phase, buyer 12 identifies one or more parameters over which the buyer 12 will negotiate. In this example, the defined parameters might include the mileage, color, price, two-wheel versus four-wheel drive, and power train warranty duration. The buyer 12 also defines a profile that reflects its needs with respect to the negotiable parameters in terms of distance, for example, by specifying the parameters within each subset and the values of n and w for each subset. In this simplified example, each parameter might form a separate subset, n=1 might be specified for the minimum absolute error for each parameter, and values of w might be specified according to the relative importance of each parameter to buyer 12.

Having identified its needs, buyer 12 generates an initial offer according to its needs and communicates the offer to the matching server 16, which communicates it or otherwise makes it available to one or more sellers 14. Matching server 16 may also store the offer within offer database 22. The offer will include values for each of the negotiable parameters. Preferably, buyer 12 has access to published list prices of the sellers 14 to allow the buyer 12 to make an optimum initial offer relative to these list prices. For example, since the buyer 12 expects to negotiate over one or more of the parameter values, the initial offer may not identify all the true needs of buyer 12 with respect to the negotiable parameters, but may instead include one or more optimum or other more desirable values buyer 12 hopes it is able to obtain for certain parameters through negotiation. The offer might also include one or more values buyer 12 has no interest in obtaining, but are included for use as "bargaining chips" based on known or expected needs of one or more sellers 14 with respect to the parameters. As such, an overall distance may be computed as described above between values in the offer and values reflecting the true needs of buyer 12, values reflecting a desired outcome of the negotiation, or any other set of values.

In response to the offer, the seller 14 may respond to buyer 12 with a counter-offer in which one or more of the parameter values in the offer have been modified to more closely approach the needs of seller 14. The counter-offer is communicated to matching server 16, preferably stored in the offer database 22, and communicated or otherwise made accessible to buyer 12. In response to the counter-offer, buyer 12 may compute an overall distance between the values contained in the counter-offer and the values reflecting the true needs or desired outcome of buyer 12. Based on the overall distance, buyer 12 may determine whether to accept this counter-offer or whether the overall distance is too large, such that further negotiation must occur. Seller 14 may be able to similarly compute overall distances associated with the values it receives from buyer 12 and the true needs or desired outcome of seller 14, such that the negotiation proceeds until such time as a buyer 12 and a seller 14 are both satisfied that the overall distances between the values contained in the offer under consideration and the values reflecting their respective true needs or desired outcomes are acceptably small. When both parties determine that these overall distances are acceptable, the pending offer will be accepted to conclude the negotiation.

Although a straightforward negotiation between a single buyer 12 and a single seller 14 is described in which each party evaluates offers from the other according to overall distance computations, the present invention is intended to encompass a one-to-many relationship between buyer 12 and sellers 14 as for a reverse auction, a many-to-one relationship between buyers 12 and seller 14 as for a forward auction, a many-to-many relationship as for an exchange, or any other relationships between one or more buyers 12 and one or more sellers 14. Moreover, although the offers are described as being stored in database 22 in connection with their communication among parties, the offers may be communicated between parties directly, or indirectly through matching server 16, without being stored in database 22. In any event, a computation of overall distance for an offer may occur at the offering party with respect to its own or another party's true needs or desired outcome, at the matching server 16 with respect to the true needs or desired outcome of either or both parties, or at the receiving party with respect to its own or another party's true needs or desired outcome. The location(s) at which overall distances are computed and evaluated will in general depend on the particular negotiation scenario and the capabilities of matching server 16 and the parties.

Interestingly, it may be that an offer from a party includes values that actually decrease the overall distance from the perspective of the receiving party—that is, the offering party has proposed one or more changes such that the offer, although deemed more desirable than the preceding offer from the perspective of the offering party, will also be more desirable from the overall perspective of the receiving party. There is in this situation no cost, and perhaps some benefit, to the receiving party in accepting the offer containing the changed values. Moreover, as noted briefly above, a party may be capable of estimating the true needs or desired outcome of another party to allow the party to estimate the overall distance for each offer from the perspective of the other party. Armed with this knowledge, the party may strategically advance the negotiation by compromising on values that do not significantly increase (or that may decrease) its own overall distance, while simultaneously significantly decreasing the overall distance of the other party. Analogously, the party may strategically avoid any compromises that increase its own overall distance, but are not likely to advance the negotiation because they do not significantly decrease the overall distance of the other party.

In this manner, based on overall distance computations according to the present invention, a negotiating party is able to readily formulate offers, evaluate offers received from another party, and make intelligent and rapid decisions to meet its true needs or achieve an acceptably optimal outcome. As the number of negotiated parameters (the dimensionality) increases, these distance computations may be increasingly beneficial, facilitating meaningful negotiation where none was previously feasible.

In one embodiment, matching engine 18 or another component associated with matching server 16 may have access to the profiles of all parties to a negotiation and automatically compute overall distances for all parties to rapidly reach an outcome that will be acceptable to all parties. This may occur with or without additional input from the parties. Matching engine 18 is in this case preferably a trusted entity that prevents any party from accessing information of any other party, and possibly provides total or partial anonymity for the parties, such that all parties are comfortable revealing their profiles to matching server 16. Matching server 16 may further provide certification of offers with respect to the financial or other ability of the offering party to perform. The matching server 16 may also provide for automatic settlement and/or fulfillment of the negotiated deal, such as is described in copending U.S. application Ser. No. 09/686,711, where appropriate. The ability of matching server 16 to conduct automatic or other mediated negotiations between one or more buyers 12 and one or more sellers 14 in the manner described above provides another important technical advantage.

Although the present invention is described in connection with negotiations over parameters associated with items, those skilled in the art will appreciate that the present invention encompasses any suitable negotiation. For example only, and not by way of limitation, parties might negotiate the terms of legal contracts according to the present invention, directly or through matching server 16. The present invention contemplates any suitable negotiation according to particular needs.

FIG. 3 illustrates an exemplary method of retrieving information according to one or more improved matching criteria. The method begins at step 100, where buyer 12 or another entity seeking information performs a needs analysis to identify one or more target items for which information is sought. At step 102, buyer 12 specifies values of one or more parameters of a target item reflecting its needs. In one embodiment, the buyer 12 may define one or more parameter subsets for the target item and specify the desired values for the parameters in each subset. Buyer 12 generates a search request incorporating these parameter values at step 104, using a web-based form or otherwise, and communicates the search request to matching server 18 at step 106.

At step 108, the matching server 16 determines the parameter values specified within the search request and, at step 110, matching engine 18 applies these parameter values against catalog database 20, offer database 22, or any other database containing information concerning available items. Matching engine 18 may apply the parameter values for the various parameter subsets sequentially, substantially simultaneously, or in any other suitable manner. Furthermore, where information on multiple target items is being sought in association with the same search request, matching engine 18 may apply parameter values for the various target items sequentially, substantially simultaneously, or in any other suitable manner. At step 112, for each target item, matching engine 18 retrieves parameter values for one or more available items from database 20 or 22. The parameter values for available items may be retrieved directly or may be generated at matching engine 18 or otherwise within matching server 16 based on other information retrieved from database 20 or 22.

For each available item and for each parameter subset, the matching engine 18 computes the distance between the parameter values retrieved for the available item and the parameter values specified for the target item, at step 114. In one embodiment, the distances are computed according to equation (1). If there is only one parameter subset defined, then the distance is computed only for the single subset. At step 116, for each available item and for each parameter subset, the matching engine 18 preferably applies an appropriate weight w as described above in connection with equation (2). Matching engine 18 computes the overall distances between one or more available items and the target item and step 118 and, at step 120, sorts these available items according to their respective overall distances from the target item. In a particular embodiment, overall distances are computed according to equation (2). At step 122, the matching server 16 communicates the results of the search to buyer 12 to allow it to make purchasing or other suitable decisions based on the results. The results may include a sorted list of available items within a predetermined overall distance of the target item, may include only available item with the shortest distance to the target item, or may be organized in any other suitable manner. Once the buyer 12 receives the result, allowing buyer 12 to make intelligent decisions to meet its needs, the method ends.

FIG. 4 illustrates a method of negotiating over one or more parameters in accordance with improved matching criteria. Although the method is described in the context of a mediated negotiation between a single buyer 12 and a single seller 14, as described above any number of buyers 12 may negotiate with any number of sellers 14 through matching server 16 or otherwise. The method begins at step 200, where the parties define the parameters to be negotiated. This may be relatively straightforward, such as if default parameters are defined according to industry standards or buyer 12 specifies the parameters to be negotiated. Alternatively, this may require preliminary negotiation. At step 202, the parties define their profiles according to their respective needs and preferences. In the context of an automatic negotiation conducted using the matching server 16, the parties would communicate their profiles to matching server 16 for secure storage and subsequent access.

At step 204, buyer 12 generates an initial offer according to its needs and one or more overall distance considerations, for example, the overall distance between values contained in the offer and the values representing its true needs or the overall distance between values in the offer and the values representing the estimated true needs of the seller 14. Buyer 12 communicates the offer to the matching server 16 at step 206 for storage in offer database 22 and, at step 208, the matching server 16 communicates the offer to seller 14 for evaluation. At step 210, seller 14 computes one or more overall distances associated with the offer, for example, the overall distance between values in the offer and the values representing its true needs or the overall distance between values in the offer and values representing the estimated true needs of buyer 12. If seller 14 decides to accept the offer at step 212 according to an associated overall distance, the negotiation concludes and the method ends.

Otherwise, if seller 14 determines that the overall distance associated with the offer is too large at step 212, the seller 14 modifies one or more parameter values in the offer at step 214 according to its needs and one or more overall distance considerations. The seller 14 communicates the counter-offer to the matching server 16 at step 216 for storage in offer database 22 and, at step 218, the matching server 16 communicates the offer to buyer 12 for evaluation. At step 220, buyer 12 computes one or more overall distances associated with the offer, for example, the overall distance between values in the offer and the values representing its true needs or the overall distance between the values in the offer and values representing the estimated true needs of seller 14. If the buyer 12 decides to accept the offer at step 222 based on an associated overall distance, the negotiation concludes and the method ends.

Otherwise, if buyer 12 determines that the overall distance associated with the offer is still too large at step 222, the buyer 12 again modifies one or more parameter values in the offer at step 224 according to its needs and one or more overall distance considerations. The method then returns to step 206, where buyer 12 communicates the counter-offer to matching server 16 for storage in offer database 22. The method may continue in this manner essentially indefinitely until an offer is accepted or a specified number of iterations is reached without acceptance. As described more fully above, the efficiency of the negotiation process and the optimality of the result may be improved where matching server 16 conducts the negotiation automatically.

Although the present invention has been described with several embodiments, a plethora of changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A system for retrieving information for a user, comprising:
   a database containing values for a plurality of parameters of a plurality of available items, each available item having corresponding parameter values; and
   a matching server operable to receive values for a plurality of parameters of at least one target item, the parameters for the target item being organized into a plurality of parameter subsets, the matching server further operable to:
   apply the parameter values for each of the plurality of parameter subsets for the target item against the database;
   for at least one available item and for each of the plurality of parameter subsets of the target item, compute a distance between the parameter values for the parameter subset for the available item and the parameter values for the parameter subset for the target item according to a distance measure specified for the parameter subset, the distance measure specified for at least one parameter subset being different than the distance measure specified for at least one other parameter subset;
   for each of the plurality of parameter subsets, apply a weight to the distance to compute a weighted distance for the parameter subset;
   compute an overall distance between the available item and the target item according to the weighted distances for the plurality of parameter subsets; and
   return results to the user reflecting the overall distance for the available item.

2. The system of claim 1, wherein the weighted distances are summed over all the parameter subsets to compute the overall distance for the available item.

3. The system of claim 1, wherein the weight for each parameter subset is user-specified according to needs of the user.

4. The system of claim 3, wherein the matching server is further operable to determine the weights for one or more parameter subsets based on one or more words, as opposed to numbers, received from the user.

5. The system of claim 1, wherein:
the distance for a first parameter subset is computed as an absolute error between the associated parameter values for the available and target items;
the distance for a second parameter subset is computed as a mean-square error between the associated parameter values for the available and target items; and
the weighted distances for the first and second parameter subsets are summed to compute the overall distance for the available item.

6. The system of claim 1, wherein the distance for a parameter subset is computed to reflect a user preference selected from the group consisting of:
exact matches between the parameter values for the available and target items and, where no exact match is possible for a parameter, a minimum difference between the values for the available and target items for that parameter;
close matches between the parameter values for the available and target items for all parameters simultaneously, where an exact match is not required for any parameter; and
an exception prohibiting exact matches between the parameter values for the available and target items.

7. The system of claim 1, wherein the user is a buyer and the overall distance for the available item allows the buyer to make a purchasing decision with respect to the available item.

8. The system of claim 1, wherein the matching server is operable to compute overall distances for a plurality of available items and to rank the available items according to their overall distances, the results returned to the user indicating at least the available item having the smallest overall distance.

9. The system of claim 1, wherein the available items are selected from the group consisting of:
parts, components, products, or other tangible items;
services;
real property; and
web pages or other documents.

10. The system of claim 1, further comprising a marketplace associated with the matching server.

11. The system of claim 1, wherein the distance $L_n$ for a parameter subset is computed as:

$$L_n = \sqrt[n]{\frac{\sum_{k}^{K} |available_k - target_k|^n}{K}}$$

where K is number of parameters in the subset, $available_k$ is the value for the available item for the kth parameter, $target_k$ is the value for the target item for the kth parameter, the summation is over all K parameters in the subset, and n is the order of the distance measure.

12. The system of claim 11, wherein the value of n for each parameter subset is user-specified according to needs of the user.

13. The system of claim 12, wherein the matching server is further operable to determine the values of n for one or more parameter subsets based on one or more words, as opposed to numbers, received from the user.

14. A system for retrieving information for a user, comprising:
a database containing values for one or more parameters of one or more available items, each available item having corresponding parameter values; and
a matching server operable to receive values for one or more parameters of at least one target item, the parameters for the target item being organized into one or more subsets, the matching server further operable to:
apply the parameter values for the target item against the database;
for at least one available item and for each parameter subset of the target item, compute a distance between the parameter values for the available item and the parameter values for the target item;
for each parameter subset, apply a weight to the distance to compute a weighted distance for the parameter subset;
compute an overall distance between the available item and the target item according to the weighted distances for the parameter subsets; and
return results to the user reflecting the overall distance for the available item;
the distance $L_n$ for a parameter subset being computed as:

$$L_n = \sqrt[n]{\frac{\sum_{k}^{K} |available_k - target_k|^n}{K}}$$

where K is number of parameters in the subset, $available_k$ is the value for the available item for the kth parameter, $target_k$ is the value for the target item for the kth parameter, the summation is over all K parameters in the subset, and n is the order of the distance measure.

15. The system of claim 14, wherein the value of n for each parameter subset is user-specified according to needs of the user.

16. The system of claim 15, wherein the matching server is further operable to determine the values of n for one or more parameter subsets based on one or more words, as opposed to numbers, received from the user.

17. A system for retrieving information for a user, comprising:
means for storing values for a plurality of parameters of a plurality of available items, each available item having corresponding parameter values; and
means for receiving values for a plurality of parameters of at least one target item, the parameters for the target item being organized into a plurality of parameter subsets;
means for applying the parameter values for each of the plurality of parameter subsets for the target item against the database;
means, for at least one available item and for each of the plurality of parameter subsets of the target item, for computing a distance between the parameter values for the parameter subset for the available item and the parameter values for the parameter subset for the target item according to a distance measure specified for the parameter subset the distance measure specified for at least one parameter subset being different than the distance measure specified for at least one other parameter subset;

means, for each of the plurality of parameter subsets, applying a weight to the distance to compute a weighted distance for the parameter subset;

means for computing an overall distance between the available item and the target item according to the weighted distances for the plurality of parameter subsets; and means for returning results to the user reflecting the overall distance for the available item.

18. Software for retrieving information for a user, the software embodied in a computer-readable medium and when executed operable to:

receive values for a plurality of parameters of at least one target item, the parameters for the target item being organized into a plurality of parameter subsets;

apply the parameter values for each of the plurality of parameter subsets for the target item against a database containing values for a plurality of parameters of a plurality of available items, each available item having corresponding parameter values;

for at least one available item and for each of the plurality of parameter subsets of the target item, compute a distance between the parameter values for the parameter subset for the available item and the parameter values for the parameter subset for the target item according to a distance measure specified for the parameter subset, the distance measure specified for at least one parameter subset being different than the distance measure specified for at least one other parameter subset;

for each of the plurality of parameter subsets, apply a weight to the distance to compute a weighted distance for the parameter subset;

compute an overall distance between the available item and the target item according to the weighted distances for the plurality of parameter subsets; and return results to the user reflecting the overall distance for the available item.

19. The software of claim 18, wherein the distance $L_n$ for a parameter subset is computed as:

$$L_n = \sqrt[n]{\frac{\sum\limits_{k}^{K} |available_k - target_k|^n}{K}}$$

where K is number of parameters in the subset, $available_k$ is the value for the available item for the kth parameter, $target_k$ is the value for the target item for the kth parameter, the summation is over all K parameters in the subset, and n is the order of the distance measure.

20. The software of claim 19, wherein the value of n for each parameter subset is user-specified according to needs of the user.

21. The software of claim 20, further operable to determine the values of n for one or more parameter subsets based on one or more words, as opposed to numbers, received from the user.

22. The software of claim 18, wherein the weighted distances are summed over all the parameter subsets to compute the overall distance for the available item.

23. The software of claim 18, wherein the weight for each parameter subset is user-specified according to needs of the user.

24. The software of claim 23, further operable to determine the weights for one or more parameter subsets based on one or more words, as opposed to numbers, received from the user.

25. The software of claim 18, wherein:

the distance for a first parameter subset is computed as an absolute error between the associated parameter values for the available and target items;

the distance for a second parameter subset is computed as a mean-square error between the associated parameter values for the available and target items; and the weighted distances for the first and second parameter subsets are summed to compute the overall distance for the available item.

26. The software of claim 18, wherein the distance for a parameter subset is computed to reflect a user preference selected from the group consisting of:

exact matches between the parameter values for the available and target items and, where no exact match is possible for a parameter, a minimum difference between the values for the available and target items for that parameter;

close matches between the parameter values for the available and target items for all parameters simultaneously, where an exact match is not required for any parameter; and an exception prohibiting exact matches between the parameter values for the available and target items.

27. The software of claim 18, wherein the user is a buyer and the overall distance for the available item allows the buyer to make a purchasing decision with respect to the available item.

28. The software of claim 18, operable to compute overall distances for a plurality of available items and to rank the available items according to their overall distances, the results returned to the user indicating at least the available item having the smallest overall distance.

29. The software of claim 18, wherein the available items are selected from the group consisting of:

parts, components, products, or other tangible items;

services;

real property; and web pages or other documents.

30. The software of claim 18, wherein the software is executed at a marketplace.

31. A method for retrieving information from a user, comprising:

receiving values for a plurality of parameters of at least one target item, the parameters for the target item being organized into a plurality of parameter subsets;

applying the parameter values for each of the plurality of parameter subsets for the target item against a database containing values for a plurality of parameters of a plurality of available items, each available item having corresponding parameter values;

for at least one available item and for each of the plurality of parameter subsets of the target item, computing a distance between the parameter values for the parameter subset for the available item and the parameter values for the parameter subset for the target item according to a distance measure specified for the parameter subset, the distance measure specified for at least one parameter subset being different than the distance measure specified for at least one other parameter subset;

for each of the plurality of parameter subsets, applying a weight to the distance to compute a weighted distance for the parameter subset;

computing an overall distance between the available item and the target item according to the weighted distances for the plurality of parameter subsets; and returning results to the user reflecting the overall distance for the available item.

32. The method of claim 31, wherein the weighted distances are summed over all the parameter subsets to compute the overall distance for the available item.

33. The method of claim 31, wherein the weight for each parameter subset is user-specified according to needs of the user.

34. The method of claim 33, wherein the weights are determined for one or more parameter subsets based on one or more words, as opposed to numbers, received from the user.

35. The method of claim 31, wherein:
the distance for a first parameter subset is computed as an absolute error between the associated parameter values for the available and target items;
the distance for a second parameter subset is computed as a mean-square error between the associated parameter values for the available and target items; and
the weighted distances for the first and second parameter subsets are summed to compute the overall distance for the available item.

36. The method of claim 31, wherein the distance for a parameter subset is computed to reflect a user preference selected from the group consisting of:
exact matches between the parameter values for the available and target items and, where no exact match is possible for a parameter, a minimum difference between the values for the available and target items for that parameter;
close matches between the parameter values for the available and target items for all parameters simultaneously, where an exact match is not required for any parameter; and
an exception prohibiting exact matches between the parameter values for the available and target items.

37. The method of claim 31, wherein the user is a buyer and the overall distance for the available item allows the buyer to make a purchasing decision with respect to the available item.

38. The method of claim 31, wherein the overall distances are computed for a plurality of available items, the method further comprising ranking the available items according to their overall distances, the results returned to the user indicating at least the available item having the smallest overall distance.

39. The method of claim 31, wherein the available items are selected from the group consisting of:
parts, components, products, or other tangible items;
services;
real property; and
web pages or other documents.

40. The method of claim 13, wherein the distance $L_m$ for a parameter subset is computed as:

$$L_n = \sqrt[n]{\frac{\sum\limits_{k}^{K} |available_k - target_k|^n}{K}}$$

where K is number of parameters in the subset, $available_k$ is the value for the available item for the kth parameter, $target_k$ is the value for the target item for the kth parameter, the summation is over all K parameters in the subset, and n is the order of the distance measure.

41. The method of claim 40, wherein the value of n for each parameter subset is user-specified according to needs of the user.

42. The method of claim 41, wherein the values of n are determined for one or more parameter subsets based on one or more words, as opposed to numbers, received from the user.

43. A method for retrieving information from a user, comprising:
receiving values for one or more parameters of at least one target item, the parameters for the target item being organized into one or more subsets;
applying the parameter values for the target item against a database containing values for one or more parameters of one or more available items, each available item having corresponding parameter values;
for at least one available item and for each parameter subset of the target item, computing a distance between the parameter values for the available item and the parameter values for the target item;
for each parameter subset, applying a weight to the distance to compute a weighted distance for the parameter subset;
computing an overall distance between the available item and the target item according to the weighted distances for the parameter subsets; and
returning results to the user reflecting the overall distance for the available item;
the distance $L_n$ for a parameter subset being computed as:

$$L_n = \sqrt[n]{\frac{\sum\limits_{k}^{K} |available_k - target_k|^n}{K}}$$

where K is number of parameters in the subset, $available_k$ is the value for the available item for the kth parameter, $target_k$ is the value for the target item for the kth parameter, the summation is over all K parameters in the subset, and n is the order of the distance measure.

44. The method of claim 43, wherein the value of n for each parameter subset is user-specified according to needs of the user.

45. The method of claim 44, wherein the values of n are determined for one or more parameter subsets based on one or more words, as opposed to numbers, received from the user.

46. A system for retrieving information for a user, comprising:
a database containing values for a plurality of parameters of each of a plurality of available items, each available item having corresponding parameter values; and
a matching server operable to receive values for a plurality of parameters of at least one target item, the parameters for the target item being organized into a plurality of parameter subsets, the matching server further operable to:
apply the parameter values for each of the plurality of parameter subsets for the target item against the database;
for each of a plurality of the available items and for each of the plurality of parameter subsets of the target item, compute a distance between the parameter values for the parameter subset for the particular available item and the parameter values for the parameter subset for the target item according to a user-specified distance measure that the user deems appropriate for the user's particular information needs, the distance measure specified for at least one parameter subset being different than the distance measure specified for at least one other parameter subset;

for each of the plurality of parameter subsets, apply a user-specified weight to the distance to compute a weighted distance for the parameter subset;

compute an overall distance between each available item and the target item according to the weighted distances for the plurality of parameter subsets;

rank the available items according to their overall distances; and return results to the user indicating at least the available item having the smallest overall distance.

47. The system of claim 46, wherein the user is a buyer and the results returned to the buyer allow the buyer to make a purchasing decision with respect to the available item.

48. Software for retrieving information for a user, the software embodied in a computer-readable medium and operable to:

receive values for a plurality of parameters of at least one target item, the parameters for the target item being organized into a plurality of parameter subsets:

apply the parameter values for each of the plurality of parameter subsets for the target item against a database containing values for a plurality of parameters of each of a plurality of available items, each available item having corresponding parameter values;

for each of a plurality of the available items and for each of the plurality of parameter subsets of the target item, compute a distance between the parameter values for the parameter subset for the particular available item and the parameter values for the parameter subset for the target item according to a user-specified distance measure that the user deems appropriate for the user's particular information needs, the distance measure specified for at least one parameter subset being different than the distance measure specified for at least one other parameter subset;

for each of the plurality of parameter subsets, apply a user-specified weight to the distance to compute a weighted distance for the parameter subset;

compute an overall distance between each available item and the target item according to the weighted distances for the plurality of parameter subsets;

rank the available items according to their overall distances; and return results to the user indicating at least the available item having the smallest overall distance.

49. The software of claim 48, wherein the user is a buyer and the results returned to the buyer allow the buyer to make a purchasing decision with respect to the available item.

50. A method for retrieving information for a user, comprising:

receiving values for a plurality of parameters of at least one target item, the parameters for the target item being organized into a plurality of parameter subsets:

applying the parameter values for each of the plurality of parameter subsets for the target item against a database containing values for a plurality of parameters of each of a plurality of available items, each available item having corresponding parameter values;

for each of a plurality of the available items and for each of the plurality of parameter subsets of the target item, computing a distance between the parameter values for the parameter subset for the particular available item and the parameter values for the parameter subset for the target item according to a user-specified distance measure that the user deems appropriate for the user's particular information needs, the distance measure specified for at least one parameter subset being different than the distance measure specified for at least one other parameter subset;

for each of the plurality of parameter subsets, applying a user-specified weight to the distance to compute a weighted distance for the parameter subset;

computing an overall distance between each available item and the target item according to the weighted distances for the plurality of parameter subsets;

ranking the available items according to their overall distances; and returning results to the user indicating at least the available item having the smallest overall distance.

51. The method of claim 50, wherein the user is a buyer and the results returned to the buyer allow the buyer to make a purchasing decision with respect to the available item.

52. Software for retrieving information for a user, the software embodied in a computer-readable medium and when executed operable to:

receive values for one or more parameters of at least one target item, the parameters for the target item being organized into one or more subsets;

apply the parameter values for the target item against a database containing values for one or more parameters of one or more available items, each available item having corresponding parameter values;

for at least one available item and for each parameter subset of the target item, compute a distance between the parameter values for the available item and the parameter values for the target item;

for each parameter subset, apply a weight to the distance to compute a weighted distance for the parameter subset;

compute an overall distance between the available item and the target item according to the weighted distances for the parameter subsets; and return results to the user reflecting the overall distance for the available item;

the distance $L_n$ for a parameter subset being computed as:

$$L_n = \sqrt[n]{\frac{\sum_{k}^{K} |available_k - target_k|^n}{K}}$$

where K is number of parameters in the subset, $available_k$ is the value for the available item for the kth parameter, $target_k$ is the value for the target item for the kth parameter, the summation is over all K parameters in the subset, and n is the order of the distance measure.

53. The software of claim 52, wherein the value of n for each parameter subset is user-specified according to needs of the user.

54. The software of claim 53, further operable to determine the values of n for one or more parameter subsets based on one or more words, as opposed to numbers, received from the user.

* * * * *

UNITED STATES PATENT AND TRADEMARK OFFICE
CERTIFICATE OF CORRECTION

PATENT NO. : 6,708,174 B1
DATED : March 16, 2004
INVENTOR(S) : Noel Tenorio

It is certified that error appears in the above-identified patent and that said Letters Patent is hereby corrected as shown below:

<u>Title page,</u>
Item [73], Assignee, please delete "i2 Technologies, Inc." insert -- i2 Technologies US Inc. --.

Signed and Sealed this

Fifteenth Day of June, 2004

JON W. DUDAS
*Acting Director of the United States Patent and Trademark Office*